(12) United States Patent
Arh et al.

(10) Patent No.: US 11,558,135 B2
(45) Date of Patent: *Jan. 17, 2023

(54) RESOLVING MEDIA SOURCE DETECTION AND SIMULCAST MONITORING AMBIGUITIES WITH MOTION SENSOR DATA

(71) Applicant: The Nielsen Company (US), LLC, New York, NY (US)

(72) Inventors: Joze Arh, Koper (SI); Igor Sotosek, Portoroz (SI); Blaž Remškar, Izola (SI); Marko Panger, Plavje (SI)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/334,361

(22) Filed: May 28, 2021

(65) Prior Publication Data

US 2021/0288733 A1  Sep. 16, 2021

Related U.S. Application Data

(63) Continuation of application No. 16/747,361, filed on Jan. 20, 2020, now Pat. No. 11,025,351, which is a
(Continued)

(51) Int. Cl.
 *H04H 20/67* (2008.01)
 *H04H 20/18* (2008.01)
 (Continued)

(52) U.S. Cl.
 CPC ............ *H04H 20/67* (2013.01); *H04H 20/12* (2013.01); *H04H 20/18* (2013.01); *H04H 60/31* (2013.01); *G01P 15/14* (2013.01); *H04B 7/2625* (2013.01)

(58) Field of Classification Search
 CPC ........ H04H 20/67; H04H 20/12; H04H 20/18; H04H 60/31; G01P 15/14; H04B 7/2625
 See application file for complete search history.

(56) References Cited

U.S. PATENT DOCUMENTS 5,581,800 A  12/1996 Fardeau et al.
8,181,196 B2  5/2012 Falcon
(Continued)

FOREIGN PATENT DOCUMENTS

CN  106204552 A  12/2016

OTHER PUBLICATIONS

United States Patent and Trademark Office, "Non-final Office Action," mailed in connection with U.S. Appl. No. 15/919,164, dated May 15, 2019, 9 pages.
(Continued)

*Primary Examiner* — John J Lee
(74) *Attorney, Agent, or Firm* — Hanley, Flight & Zimmerman, LLC

(57) ABSTRACT

Example apparatus disclosed herein determine that an output media signal from a monitored media device corresponds to at least a first media signal from a first source device in communication with the monitored media device, and a second media signal from a second source device in communication with the monitored media device. Disclosed example apparatus also access motion data reported by one or more of a first accelerometer associated with a first remote control device, a second accelerometer associated with a second remote control device, a third accelerometer associated with a third remote control device, the first remote control device associated with the first source device, the second remote control device associated with the second source device, the third remote control device associated with the monitored media device. Disclosed example appa-
(Continued)

ratus also identify, based on the motion data, a source of the output media signal from the monitored media device.

20 Claims, 9 Drawing Sheets

Related U.S. Application Data continuation of application No. 15/919,164, filed on Mar. 12, 2018, now Pat. No. 10,541,766.

(60) Provisional application No. 62/506,366, filed on May 15, 2017.

(51) Int. Cl.
*H04H 20/12* (2008.01)
*H04H 60/31* (2008.01)
*H04B 7/26* (2006.01)
*G01P 15/14* (2013.01)

(56) References Cited

U.S. PATENT DOCUMENTS

| | | | |
|---|---|---|---|
| 8,434,100 B2 | 4/2013 | Wheeler et al. | |
| 8,670,879 B1 | 3/2014 | Angelucci | |
| 8,751,948 B2 | 6/2014 | Wetzer et al. | |
| 8,755,738 B2 | 6/2014 | Forutanpour et al. | |
| 8,784,207 B2 | 7/2014 | Ramaswamy et al. | |
| 8,826,317 B2 | 9/2014 | Krug | |
| 9,055,336 B2 | 6/2015 | Ramaswamy et al. | |
| 9,237,292 B2 | 1/2016 | Schafer et al. | |
| 9,696,336 B2 | 7/2017 | Jain et al. | |
| 9,894,415 B2 | 2/2018 | Knox | |
| 10,541,766 B2 | 1/2020 | Arh et al. | |
| 11,025,351 B2 | 6/2021 | Arh et al. | |
| 2002/0059189 A1* | 5/2002 | Hanes | G06F 16/30 |
| 2015/0186609 A1* | 7/2015 | Utter, II | A61B 5/742 |
| | | | 600/301 |
| 2016/0094864 A1 | 3/2016 | Basso et al. | |
| 2017/0008162 A1* | 1/2017 | Tsubota | H04L 12/282 |
| 2017/0048566 A1* | 2/2017 | Srinivasan | H04N 21/23418 |

OTHER PUBLICATIONS

United States Patent and Trademark Office, "Notice of Allowance," mailed in connection with U.S. Appl. No. 15/919,164, dated Sep. 11, 2019, 8 pages.

United States Patent and Trademark Office, "Notice of Allowance," mailed in connection with U.S. Appl. No. 16/747,361, dated Jan. 27, 2021, 8 pages.

United States Patent and Trademark Office, "Non-final Office Action," mailed in connection with U.S. Appl. No. 16/747,361, dated Oct. 1, 2020, 9 pages.

* cited by examiner

RESOLVING MEDIA SOURCE DETECTION AND SIMULCAST MONITORING AMBIGUITIES WITH MOTION SENSOR DATA

RELATED APPLICATION(S)

This patent arises from a continuation of U.S. patent application Ser. No. 16/747,361 (now U.S. Pat. No. 11,025, 351), which is entitled "RESOLVING MEDIA SOURCE DETECTION AND SIMULCAST MONITORING AMBIGUITIES WITH MOTION SENSOR DATA," and which was filed on Jan. 20, 2021, which is a continuation of U.S. patent application Ser. No. 15/919,164 (now U.S. Patent No. 10,541,766), which is entitled "RESOLVING MEDIA SOURCE DETECTION AND SIMULCAST MONITORING AMBIGUITIES WITH MOTION SENSOR DATA," and which was filed on Mar. 12, 2018, which claims the benefit of U.S. Provisional Application No. 62/506,366, which is entitled "RESOLVING MEDIA SOURCE DETECTION AND SIMULCAST MONITORING AMBIGUITIES WITH MOTION SENSOR DATA" and which was filed on May 15, 2017. Priority to U.S. Patent application Ser. No. 16/747,361, U.S. patent application Ser. No. 15/919,164 and U.S. Provisional Application Ser. No. 62/506,366 is claimed. U.S. patent application Ser. No. 16/747,361, U.S. patent application Ser. No. 15/919,164 and U.S. Provisional Application Ser. No. 62/506,366 are hereby incorporated by reference in their respective entireties.

FIELD OF THE DISCLOSURE

This disclosure relates generally to media monitoring and, more particularly, to resolving media source detection and simulcast monitoring ambiguities with motion sensor data.

BACKGROUND

Some media monitoring systems employ media source detection to determine which of several media sources is providing media being presented by a monitored media device. For example, in a typical home environment, a television may be communicatively coupled to several different physical media sources, such as, but not limited to, a set-top box (STB), a digital versatile disk (DVD) player, a Blu-Ray Disk™ player, a gaming console, a computer, etc., capable of providing media for presentation by the television. Furthermore, one or more of the physical media sources may be able to access different broadcast channels, media streams, etc. which may also be considered different virtual media sources. Accurate detection of the active media source (e.g., physical and/or virtual) providing the media presented by the monitored media device enables reliable identification of the media and, thus, accurate crediting of audience exposure to the media.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Figure 1:
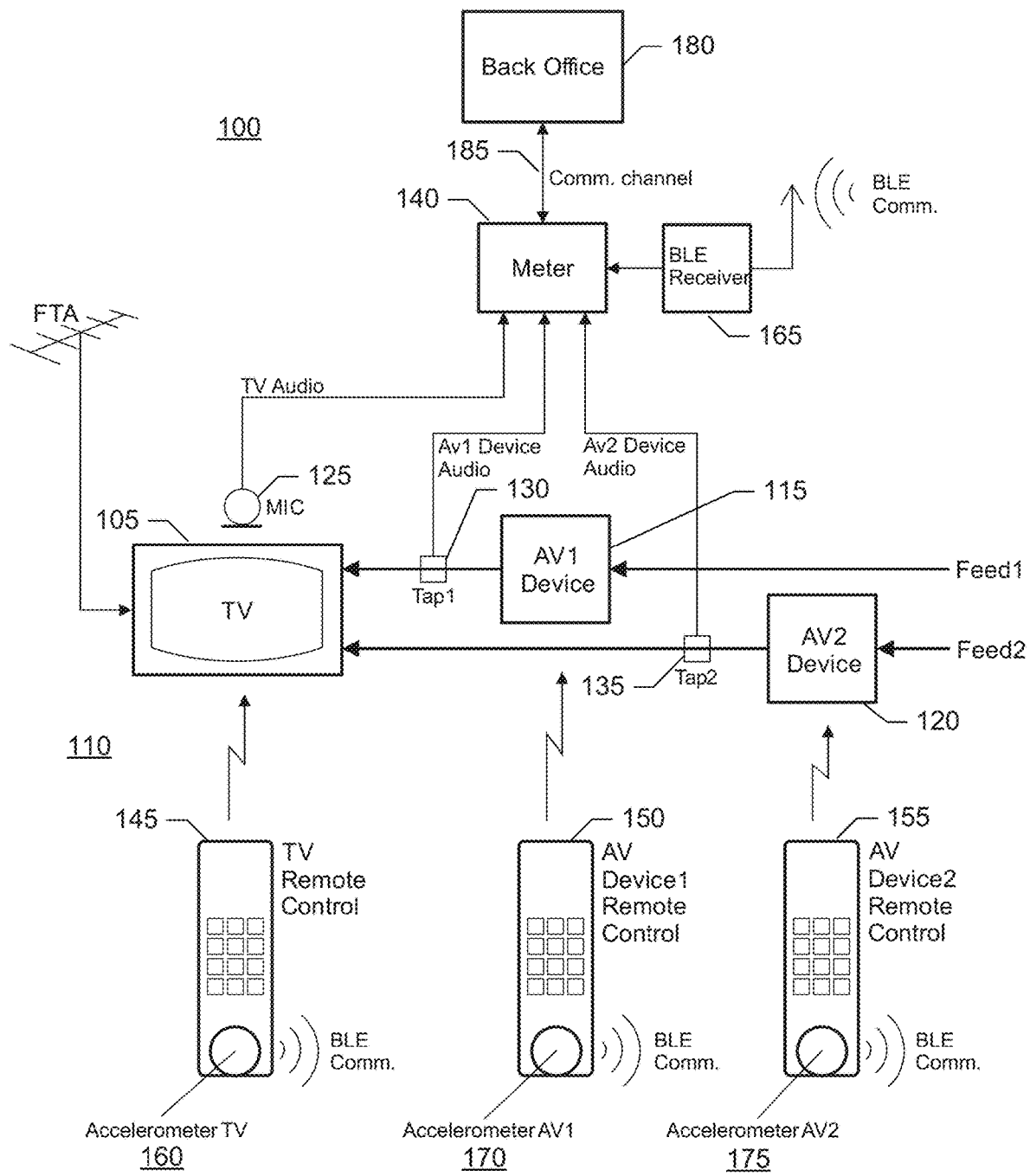
FIG. 1 is a block diagram of a first example media monitoring system structured to use motion sensor data as disclosed herein to resolve source detection and/or simulcast monitoring ambiguities for an illustrated example media entertainment system in which the media sources are arranged according to a first example arrangement.

Example methods, apparatus, systems and articles of manufacture (e.g., physical storage media) to resolve media source detection and simulcast monitoring ambiguities with motion sensor data are disclosed herein. Some example techniques disclosed herein to resolve media source detection ambiguities with motion sensor data use Bluetooth accelerometer tags affixed to handheld devices, such as remote control devices, game controllers, etc., to obtain motion data that can be used as hints for resolving source detection ambiguities. For example, the accelerometer hints are used when (1) the monitored audio from a media device outputting a media presentation matches audio detected from two or more possible sources or (2) the monitored audio from the media device does not match audio detected from any of the possible sources. If either condition (1) or condition (2) above is true, example source ambiguity resolution techniques disclosed herein use knowledge of the arrangement of the source devices (e.g., whether sources are daisy chained or coupled to separate inputs of the media device) and the accelerometer motion data to determine which source provided the media being output by the monitored media device. In some examples, if neither condition (1) nor condition (2) above is true, the unique match of the monitored audio from the media device and the audio detected from just one of the possible sources is sufficient to identify the media source.

Some example techniques disclosed herein to resolve simulcast detection ambiguities with motion sensor data use Bluetooth accelerometer tags affixed to handheld devices, such as remote control devices, game controllers, etc., to obtain motion data that can be used as channel change hints for resolving simulcast crediting. In a simulcast scenario, a media device meter employing audio matching (e.g., based on watermarks, signatures and/or other audio correlation/matching techniques) may be unable to detect a channel change between two channels broadcasting the same simulcast content until the content changes. Example simulcast ambiguity resolution techniques disclosed herein use motion data reported by a Bluetooth accelerometer tag affixed to a remote control to detect channel change hints. The channel change hints are used to identify when a channel change occurred to credit the simulcast broadcast to the proper channel.

By using accelerometer motion data to generate source detection and/or channel change hints in accordance with the teachings of this disclosure, the example source and simulcast ambiguity resolution techniques disclosed herein are not limited to a particular type of remote control technology (e.g., infrared (IR) vs. Bluetooth vs. WiFi) and do not require learning specific device commands or maintaining a database of such commands.

These and other example methods, apparatus, systems and articles of manufacture (e.g., physical storage media) to resolve media source detection and simulcast monitoring ambiguities with motion sensor data are disclosed in greater detail below.

Usage of infrared (IR) or radio based (e.g., WiFi, Bluetooth, etc.) remote control devices for controlling audio video (AV) devices can be detected by capturing infra-red communication or radio signal commands. Some existing media device meters (also referred to as audience measurement meters, site units, home units, etc.) detect the Audio-Video (AV) sources or, more generally, media sources providing media to the media presentation device (e.g., TV) by correlating audio signals from a microphone sensing the audio output by the media presentation device (e.g., TV) with audio signals acquired from the sources outputs (e.g., via audio taps). However, there are some scenarios in which audio correlation is not sufficient, is not possible or is otherwise avoided. For example, audio signal acquisition from AV equipment can increase complexity and cost of the audience meters and/or overall media monitoring system, and can interfere with other devices in the home. Example techniques disclosed herein to resolve media source detection and simulcast monitoring ambiguities with motion sensor data can overcome some of these limitations of existing meters and monitoring systems.

Figure 2:
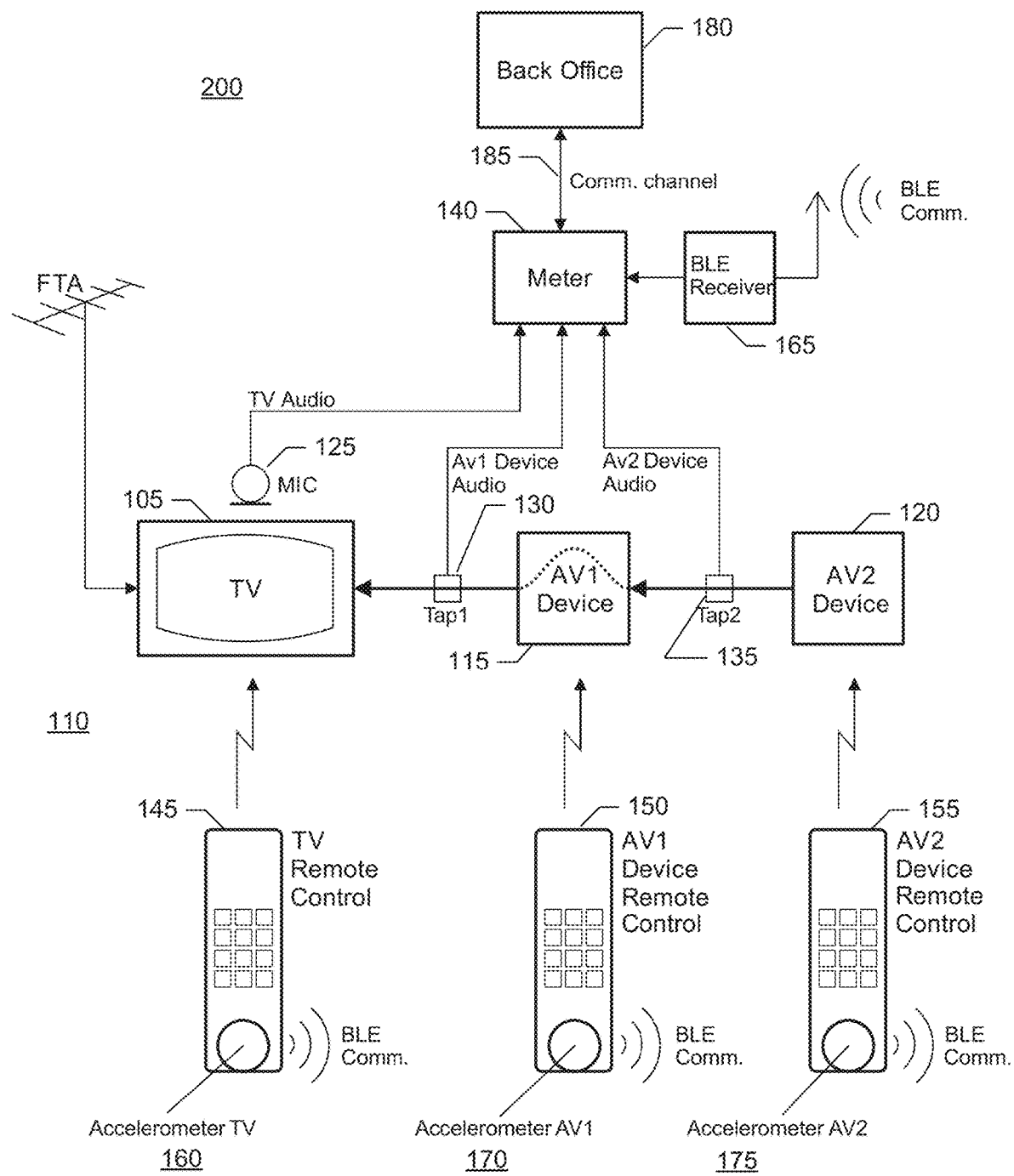
FIG. 2 is a block diagram of a second example media monitoring system structured to use motion sensor data as disclosed herein to resolve source detection and/or simulcast monitoring ambiguities for the illustrated example media entertainment system in which the media sources are arranged according to a second example arrangement.
Figure 3:
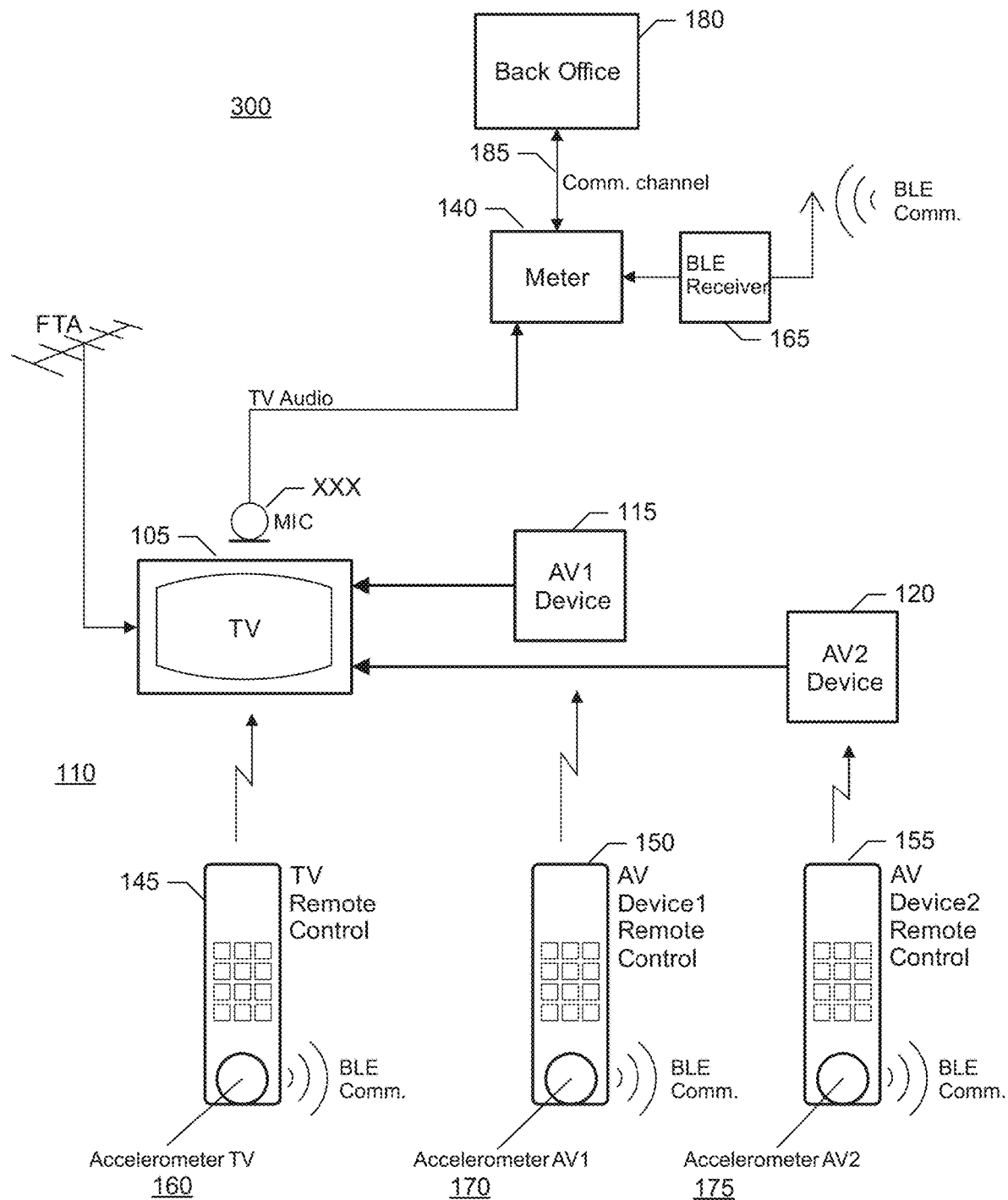
FIG. 3 is a block diagram of a third example media monitoring system structured to use motion sensor data as disclosed herein to resolve source detection and/or simulcast monitoring ambiguities for the illustrated example media entertainment system in which the media sources are arranged according to the first example arrangement.

FIGS. 1-3 illustrate example media monitoring systems 100, 200 and 300 structured to use motion sensor data as disclosed herein to resolve source detection and/or simulcast monitoring ambiguities when monitoring media presented by an example media output device 105 of an illustrated example media entertainment system 110. As noted above, like/similar elements in the figures are labeled with the same reference numerals. As used herein, the term "media" includes any type of content and/or advertisement delivered via any type of distribution medium. Thus, media includes television programming or advertisements, radio programming or advertisements, movies, web sites, streaming media, etc. Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc. In some examples, media monitoring information is aggregated to determine ownership and/or usage statistics of media devices, relative rankings of usage and/or ownership of media devices, types of uses of media devices (e.g., whether a device is used for browsing the Internet, streaming media from the Internet, etc.), and/or other types of media device information. In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.).

The example media entertainment system 110 of FIGS. 1-3 includes two example media source devices 115 and 120, also referred to as AV devices 115 and 120, which are labeled AV1 and AV2 in the drawings, and the example media output device 105, also referred to as a media presentation device 105, such as a television or any other AV presentation device, which is labeled TV in the drawings. Therefore, in the examples of FIGS. 1-3, there are three possible sources of media to be presented by the media output device (e.g., TV), namely, the media source devices 115 and 120 (i.e., AV1 and AV2) or the media output device 105 (e.g., TV) itself. The AV devices 115 and 120 (AV1 and AV2) can be any type of media source device, such as, but not limited to, a set-top box (e.g., cable receiver, satellite receiver, Internet protocol television (IPTV) receiver, etc.), a digital media player (e.g., a Roku® media player, a Slingbox®, a Tivo®, etc.) or other over the top (OTT) device, a DVD player, a VCR, a game console, etc.

The illustrated example media monitoring systems 100 and 200 of FIGS. 1 and 2 include an example microphone 125 (labeled MIC) to sense the audio output from the media output device 105 (labeled TV), and example audio taps 130 and 135 (labeled Tap 1 and Tap 2) to sense the audio output from the two media source devices 115 and 120 (AV1 and AV2), respectively. In some examples, the line audio of the media output device 105 (labeled TV) can be sensed, in addition to or as an alternative to using the microphone 125. An example meter 140 monitors the audio signals sensed by the microphone 125 (MIC) and the audio taps 130 and 135 (labeled Tap 1 and Tap 2). As such, the audio taps 130 and 135 can be implemented by any device capable of tapping, splitting, etc., the audio output by a media source such that the audio can be received/input by two or more other devices. The meter 140 can be any media monitoring meter, audience measurement meter, etc., for monitoring media presented by a media device, such as the media output device 105. To perform source detection, the meter 140 correlates the audio signal sensed by the microphone 125 (MIC) with the respective audio signals sensed by the audio taps 130 and 135 (labeled Tap 1 and Tap 2) to determine whether the microphone audio signal matches one or both of the audio tap signals. A correlation match (e.g., a positive correlation satisfying a threshold, such as by meeting or exceeding the threshold) means that audio signal captured on the microphone 125 (MIC) corresponds to the audio signal output from the media source devices 115 and/or 120

(AV1 and/or AV2). If there is no match, then the media output device 105 (e.g., TV), itself is a source of media output signal.

The audio correlation performed by the meter 140 in the illustrated examples of FIGS. 1 and 2 can involve correlating sampled audio streams obtained from the microphone 125 (MIC) and from the audio taps 130 and 135 (labeled Tap 1 and Tap 2), correlating audio signatures generated from sampled audio streams obtained from the microphone 125 (MIC) and from the audio taps 130 and 135 (labeled Tap 1 and Tap 2), correlating watermarks detected from sampled audio streams obtained from the microphone 125 (MIC) and from the audio taps 130 and 135 (labeled Tap 1 and Tap 2), etc. Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

The illustrated examples of FIGS. 1 and 2 depict different source detection ambiguities that can arise when using only audio correlation (e.g., stream matching, signature matching, watermark matching, etc.) for media source detection. In both examples, under some circumstances, the meter 140 may determine that the audio signals sensed by both of the audio taps 130 and 135 (Tap 1 and Tap 2), which correspond to the respective media sources 115 and 120 (AV1 and AV2), match (e.g., have respective positive correlations satisfying a threshold, such as by meeting or exceeding the threshold) the audio signal captured on the microphone 125 (MIC), which corresponds to output of the media output device 105 (e.g., TV). In the illustrated example of FIG. 1, such a media source detection ambiguity can arise due to source simulcasting, in which both source devices 115 and 120 (AV1 and AV2) receive the same media content through different feeds (e.g., labeled as Feed1, Feed2) because both sources 115 and 120 are tuned to the same broadcaster, or to two different broadcasters generating the same content for the given time period. The feeds in the illustrated examples can be any type and/or number of media feeds, such as, but not limited to, a terrestrial TV feed, a cable feed, a satellite feed, an IPTV feed, an Internet feed, etc. In the illustrated example of FIG. 2, such a media source detection ambiguity can arise due to the daisy-chain arrangement of the media source devices 115 and 120 (AV1 and AV2), in which the media source device 120 (AV2) is connected as an input to the media source device 115 (AV1), and the media source device 115 (AV1) can pass-through the signal received from the media source device 120 (AV2) and output this signal to the media output device 105 (e.g., TV).

The example media monitoring system 300 of FIG. 3 illustrates an example implementation in which audio sensing and correlation is unavailable or otherwise not implemented for media source detection. As such, in the illustrated example of FIG. 3, media source detection ambiguities can arise because monitored audio signals for source detection are not available, or are avoided because of complexity, user acceptance and/or high costs.

To help resolve such media source detection ambiguities, some prior media monitoring systems capture infrared (IR) commands from remote controls as hints to relay to the meter and back office when audio correlations are not sufficient for source detection. However, newer remote controls, as well also game pads, can use radio frequency communication, such as Bluetooth Low Energy (BLE) wireless radio communication, to communicate with a media (e.g., AV) source device and/or media output device (e.g., TV). Capturing (e.g., sniffing) such wireless radio communication can be a complex task and sometimes is not feasible. For example, the BLE access address of the remote control device may need to be known before BLE packets can be captured to understand the activity of the wireless radio remote control.

In contrast, example source and simulcast ambiguity resolution techniques disclosed herein can be used in the example media monitoring systems 100, 200 and 300 of FIGS. 1, 2 and/or 3 to ascertain source detection hints from remote control usage regardless of the type of remote control. Remote control devices for media (e.g., AV) source devices and media output devices (e.g., TVs) are generally hand-held devices. When used, a remote control device (also referred to herein as a remote control) is held in the hand of a user (e.g., viewer, listener, etc.) and, therefore, motion can be an indication of use. Example source and simulcast ambiguity resolution techniques disclosed herein use tags having accelerometers supporting BLE communication to detect motion of remote control devices. Such BLE accelerometer tags can be sufficiently small to be affixed to remote controls, game pads, etc., and have a relatively long battery lifetime (e.g., 1 year or more). By using such BLE accelerometer tags, the detected motion data can replace, or at least augment, the need for infra-red and/or radio based capturing technology for providing source detection and channel change hints to TV audience meters, such as the example meter 140 in the example media monitoring systems 100, 200 and 300 of FIGS. 1-3.

For example, the example media entertainment system 110 in the illustrated examples of FIGS. 1-3 includes an example remote control 145 (labeled TV Remote Control) to control the media output device 105 (e.g., TV), an example remote control device 150 (labeled AV1 Remote Control) to control the media source device 115 (e.g., AV1 Device) and an example remote control device 155 to control the media source device 120 (e.g., AV2 Device). In the illustrated examples of FIGS. 1-3, the media monitoring systems 100, 200 and 300 include an example BLE accelerometer tag 160 (labeled Accelerometer TV) affixed or otherwise coupled to the remote control 145 to sense motion associated with controlling the media output device 105 (e.g., TV) and to transmit the motion activity data (e.g., labeled as BLE Comm.) to an example BLE receiver 165 included in or in communication with the example meter 140. The example media monitoring systems 100, 200 and 300 also include an example BLE accelerometer tag 170 (labeled Accelerometer AV1) affixed or otherwise coupled to the remote control 150 to sense motion associated with controlling the media source device 115 (e.g., AV1) and to transmit the motion activity data (e.g., labeled as BLE Comm.) to the example BLE receiver 165. The example media monitoring systems 100, 200 and 300 further include an example BLE accelerometer tag 175 (labeled Accelerometer AV2) affixed or otherwise coupled to the remote control 155 to sense motion associated with controlling the media source device 120 (e.g., AV2) and to transmit the motion activity data (e.g., labeled as BLE Comm.) to the example BLE receiver 165. As such, the BLE receiver 165 can be implemented by any BLE receiver capable of receiving BLE packets advertised or otherwise transmitted by BLE accelerometer tags.

In some examples, additional accuracy can be obtained by also using a magnetometer and/or gyroscope, but this may result in higher power consumption. Thus, a given example implementation of the source and simulcast ambiguity resolution techniques disclosed herein may use or omit additional magnetometer and/or gyroscope functionality based on a tradeoff between accuracy vs. power consumption, tag dimensions, battery life, etc.

At least the following two types of motion hint data can be obtained by an example meter, such as the meter 140 in the examples of FIGS. 1-3, employing BLE accelerometer tags, such as the BLE accelerometer tags 160, 170, 175, with example source and simulcast ambiguity resolution techniques disclosed herein. For example, the meter 140 can obtain average, or aggregate, motion data from a BLE accelerometer tag (e.g., one or more of the BLE accelerometer tags 160, 170, 175) affixed to a given remote control device (e.g., one or more of the remote control devices 145, 150, 155), which indicates that the given remote control device (e.g., one or more of the remote control devices 145, 150, 155) is in use. Additionally or alternatively, the meter 140 can obtain motion data from a BLE accelerometer tag (e.g., one or more of the BLE accelerometer tags 160, 170, 175) affixed to a given remote control device (e.g., one or more of the remote control devices 145, 150, 155), which is indicative of specific movement(s) of the given remote control device (e.g., one or more of the remote control devices 145, 150, 155), such as gestures (ascertained by evaluating maximal values, average, values, a certain sequence of events, etc., and/or a combination thereof), a possibility that a given key has pressed on the remote control (and, thus, that the remote control is actively used), etc. Such motion hint data can be used to resolve the source detection ambiguities that can arise in prior media monitoring systems when using only audio correlation for media source detection.

For example, FIG. 1 illustrates an example simulcast scenario in which both media source devices 115 and 120 (e.g., AV1 and AV2) can be tuned to the same channel, or to different channels broadcasting the same media content, and, thus, receive the same source media from inputs Feed1 and Feed2. FIG. 2 illustrates an example daisy-chain scenario in which the AV signal from the media source devices 120 (AV2) can pass through the media source devices 115 (AV1). In both example scenarios, the same audio signal is output from both of the media source devices 115 and 120 (AV1 and AV2). As disclosed in further detail below, remote control motion hint data can be used to resolve the potential ambiguity as to which media source 115 or 120 is providing the media being output by the media output device 105. Remote control motion hint data can also be used to resolve the source detection ambiguities that arise when no audio correlation data is available for media source detection, such as in the example of FIG. 3. An example program than can be executed by the example meter 140 to leverage remote control motion hint data to resolve media source detection ambiguities is illustrated FIG. 7, which is described in further detail below.

The example media monitoring systems 100, 200 and 300 of FIGS. 1-3 also include an example back office 180 associated with an audience measurement entity (AME) (e.g., such as The Nielsen Company (US), LLC.) The back office 180 can be implemented by, for example, a central office, central processing facility including and/or accessing one or more servers, processing clouds, etc. In the illustrated examples, the back office 180 is in communication with the meter 140 via an example communication channel 185 (labeled Comm. Channel), which can be implemented by any communication network (e.g., private/public), connection, link, etc. In the illustrated example, the back office 180 receives meter data reported by the meter 120, which can include media identification data (e.g., watermarks, signatures, etc.) identifying the media presented by the media output device 105 (e.g., TV), as well as data identifying the source(s) of presented media, which source ambiguities being resolved by the meter 140 using motion hint data in accordance with the teachings of this disclosure. In some examples, the meter 140 reports the motion hint data to the back office 180, which implements the example program of FIG. 7 to resolve media source detection ambiguities.

Figure 4:
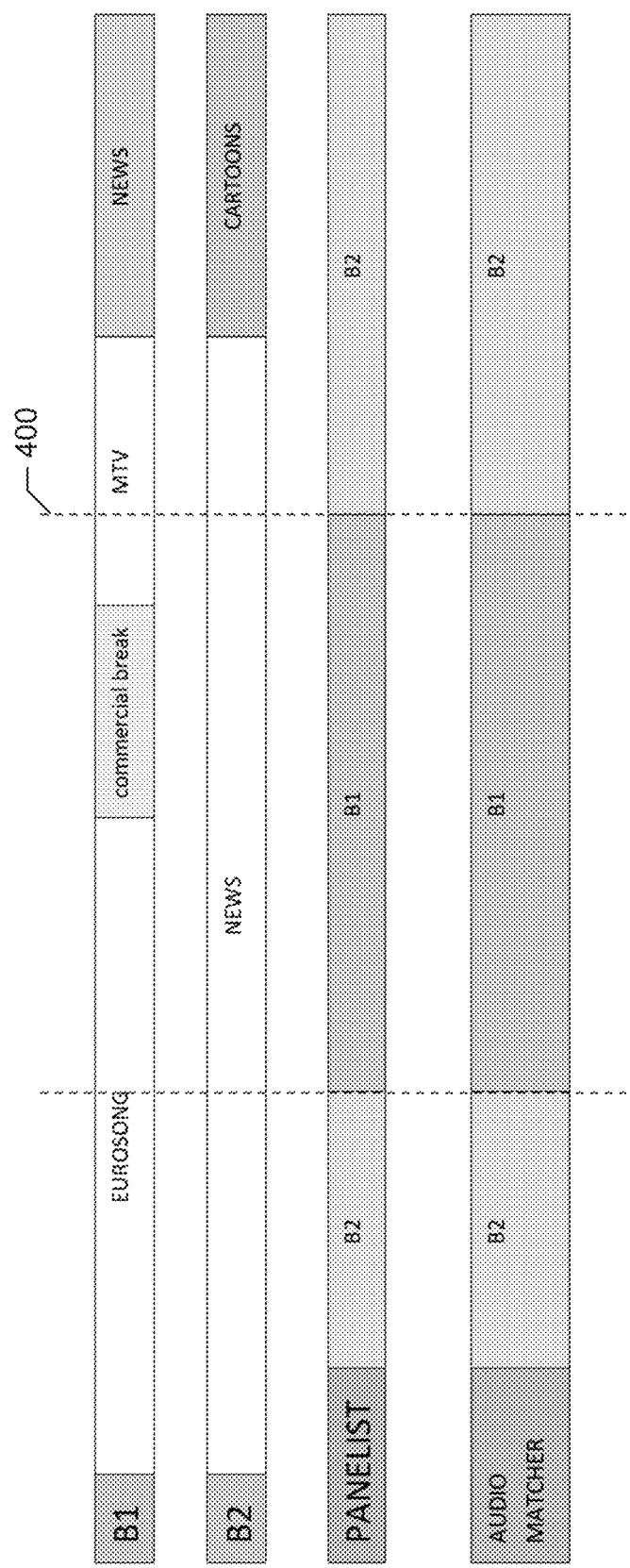
FIG. 4 illustrates example processing and media crediting decisions performed by the example media monitoring systems of FIGS. 1-3 when monitored media does not correspond to a simulcast scenario.
Figure 5:
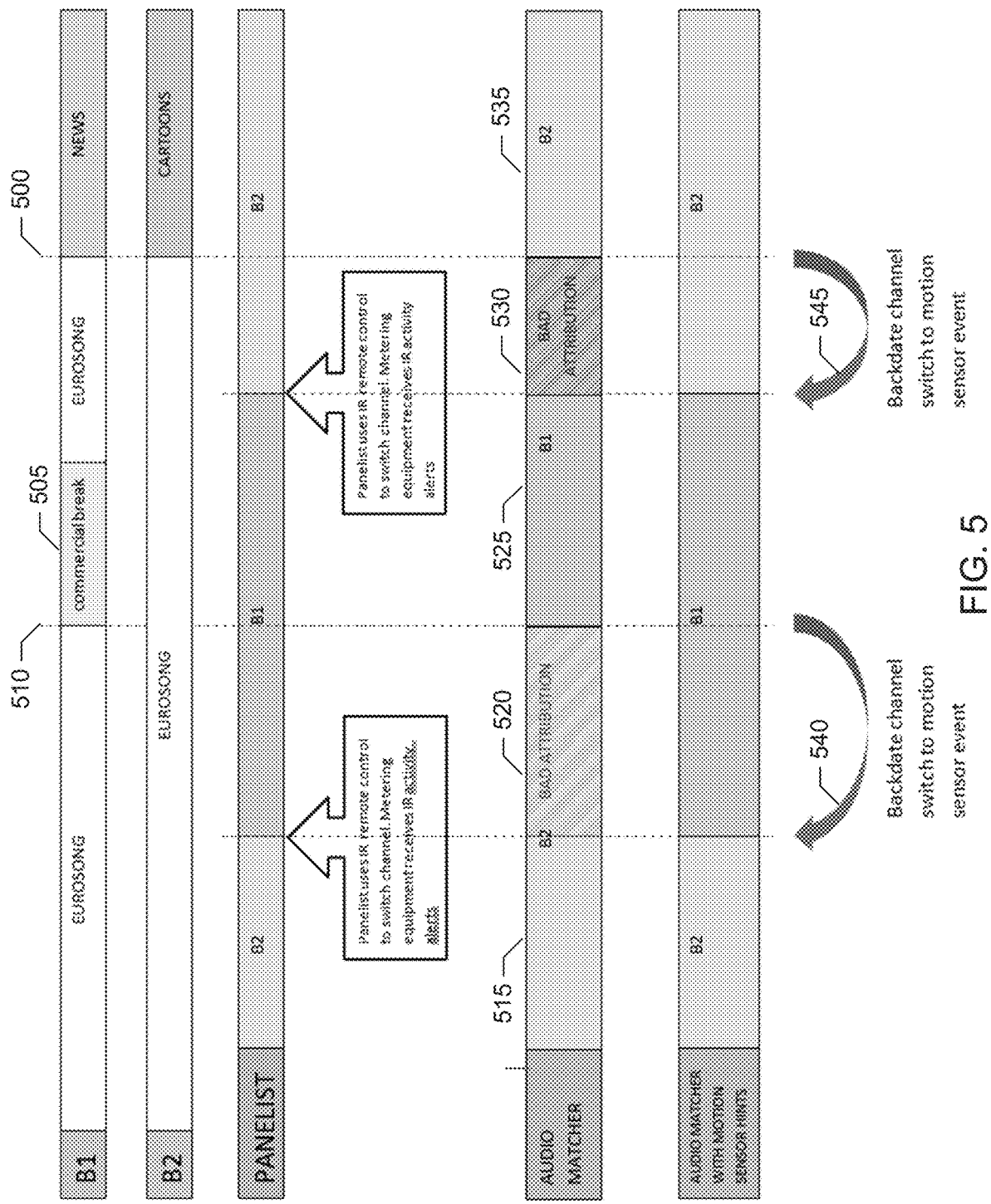
FIG. 5 illustrates example processing and media crediting decisions performed by the example media monitoring systems of FIGS. 1-3 when monitored media corresponds to a simulcast scenario.

FIGS. 4-5 illustrate operation of the example media monitoring systems 100, 200, 300 of FIGS. 1-3 to resolve simulcast monitoring ambiguities when monitoring media presented by the illustrated example media entertainment system 110. In the illustrated examples of FIGS. 4-5, bars labeled B1 represent media (e.g., content, advertisements, etc.) broadcast by a first broadcaster (e.g., broadcaster B1), whereas bars labeled B2 represent media (e.g., content, advertisements, etc.) broadcast by a second broadcaster (e.g., broadcaster B2). In the illustrated examples of FIGS. 4-5, bars labeled PANELIST represent the ground truth corresponding to what media the panelist actually consumed, whereas bars labeled AUDIO MATCHER represent the media that an audio-based media matching system not employing motion sensor hints as disclosed herein would determine that the panelist consumed. In the illustrated example of FIG. 5, the bar labeled AUDIO MATCHER WITH MOTION SENSOR HINTS represents the media that an audio-based media matching system that does employ motion sensor hints as disclosed herein (e.g., one or more of the example media monitoring systems 100, 200, 300) would determine that the panelist consumed.

As noted above, audio matching (e.g., signature-based, watermark-based, etc.) for media crediting includes at least two parts. A first part involves maintaining (e.g., stored in the back office) reference audio data (e.g., reference signatures, reference watermarks, etc.) for the broadcast channels of interest to be credited. A second part involves obtaining monitored audio data (e.g., monitored signatures, monitored watermarks, etc.) coming from the panelist metering equipment and representing what panelist has watched. The process of crediting media consumption includes looking for parts of audio in reference tracks that match parts of audio in the monitored audio coming from panelist metering equipment.

In the illustrated example of FIG. 4, there are two broadcasters, B1 and B2. In a typical broadcast scenario, the broadcasters B1 and B2 are broadcasting different content and, thus, they are broadcasting different audio. In such a scenario, a media monitoring system employing audio matching can determine that a panelist switched from B1 to B2 at time 400 by comparing the monitored audio to the reference audio, which is sufficient to identify what the panelist was watching and when the panelist switched from B1 to B2.

The example of FIG. 5 illustrates limitations of audio matching without the use of motion hints as disclosed herein. One such limitation is the inability to differentiate between two broadcasters when they broadcast the same content, referred to as simulcast broadcasting. For example, in FIG. 5, broadcasters B1 and B2 broadcast the same program for the first couple of hours (e.g., up to time 500), with the only difference in the media being broadcast during this time being a short commercial break 505 that B1 inserted at time 510.

Some prior media monitoring systems attempt to resolve simulcast crediting in two parts. First, the prior systems match audio blocks (corresponding to the bar labeled AUDIO MATCHER). With reference to the example of FIG. 5, initially, the reference audio coming from both broadcasters is the same. The prior audio matching algorithm has two potential match candidates and, in the illustrated example, randomly selects B2 (see reference numeral 515). In this example, the selection of B2 happens to be correct. However, later on, the crediting of B2 becomes wrong (see reference numeral 520), since the prior audio matcher (corresponding to the bar labeled AUDIO MATCHER) has credited part of the panelist's viewing of broadcaster B1's broadcast to broadcaster B2. In the illustrated example, such attribution persists until the prior audio matcher reaches the commercial insertion (at time 510). Until then, the prior audio matching algorithm has no reason to believe the panelist switched sources. At the commercial insertion point (time 51), the audio is different and the prior audio matcher (corresponding to the bar labeled AUDIO MATCHER) then correctly switches crediting to broadcaster B1 (see reference number 525). In the illustrated example, the panelist later switches back to B2 and again the prior audio matcher algorithm (corresponding to the bar labeled AUDIO MATCHER) makes an error by wrongly attributing part of the panelist's viewing of the B2 broadcast to B1 (see reference numeral 530). Such incorrect crediting persists until the simulcast is over and the reference audio becomes different, at which point the audio matcher can correctly attribute viewing (see reference numeral 535).

To resolve the simulcast crediting errors associated with the using just an audio matching algorithm (corresponding to the bar labeled AUDIO MATCHER), some prior media monitoring systems may use panelist IR remote control stream detection to try to detect the time of a channel change. For example, some such prior media monitoring systems detect IR activity from the TV remote control when the panelist changes programs, and store timestamps of IR events. The prior audio matcher can use the timestamps of IR activity to backdate the channel switch to a point earlier than the commercial insertion point, which can allow the viewing to be correctly attributed to the broadcaster. In general, prior media monitoring system can user IR remote control activity to backdate channel switches detected by the audio matcher to earlier points in time.

However, such prior techniques based on IR remote control activity have limitations. Detecting/listening to IR remote control stream typically requires a process of teaching the metering device to recognize IR activity of a particular consumer device. This extends time to install the meter, and requires database storage for IR data library in the meter and/or in the back office and continuous maintenance of the database with new consumer devices. Also, IR remote control technology is becoming outdated and many consumer device vendors are replacing IR technology with Bluetooth and/or WiFi remote controls. However, detecting/sniffing Bluetooth and/or WiFi communications can be difficult, if not impossible, because such communications are often encrypted. This makes it difficult to use remote control activity hints when resolving simulcast crediting, which can degrade the accuracy crediting with audio matching technology.

In contrast, example source and simulcast ambiguity resolution techniques disclosed herein use tags (e.g., such as the tags 160, 170, 175) having accelerometers with BLE communication to detect channel change hints from operation of remote control devices (e.g., such as the remote control devices 145, 150, 155). By attaching a battery powered wireless accelerometer sensor to a remote control device (e.g., as shown in the examples of FIGS. 1-3), the example media monitoring systems 100. 200. 300 employing source and simulcast ambiguity resolution techniques disclosed herein can determine when the panelist has been holding a given remote control in his/her hand. Such disclosed media monitoring systems can translate the motion data obtained from the accelerometer tags to a channel change and/or other remote control activity hint that can be used to backdate channel switching. Such back-dating is illustrated by reference numerals 540 and 545 associated with the bar labeled AUDIO MATCHER WITH MOTION SENSOR HINTS of the example of FIG. 5. In general, by processing the motion sensor data from an accelerometer tag affixed to a remote control device, disclosed example source and simulcast ambiguity resolution techniques can determine what the panelist has been trying to control and, thus, deduce the potential source of the content.

Example source and simulcast ambiguity resolution techniques disclosed herein have many benefits. For example, such techniques do not require training the system to learn the remote control commands. Thus, installation time is shorter. Also, because there is no need for training, there is also no need for storage space in the back office to store IR library data and also no need for maintenance if it. Further, such disclosed techniques can monitor all known, and future, types of remote controls. There is no need to update tracking technology when a new remote control technology appears on the field. This is because monitoring relies on a battery powered accelerometer affixed to the user remote control and does not rely on the particular technology employed by the remote control to communicated with the target device.

In some examples, further hints on what remote control command was activated by the user (e.g., channel change, volume up, . . . ) can be achieved by analyzing motion data coming from the accelerometer tag. For example, motion data associated with a long key press (e.g., corresponding to a volume up/down command) can be distinguished from motion data associated with a short key press (e.g., corresponding to a channel change command).

An example program than can be executed by the example meter 140 and/or the example back office 180 to leverage remote control motion hint data to resolve simulcast crediting ambiguities is illustrated FIG. 8, which is described in further detail below.

Figure 6:
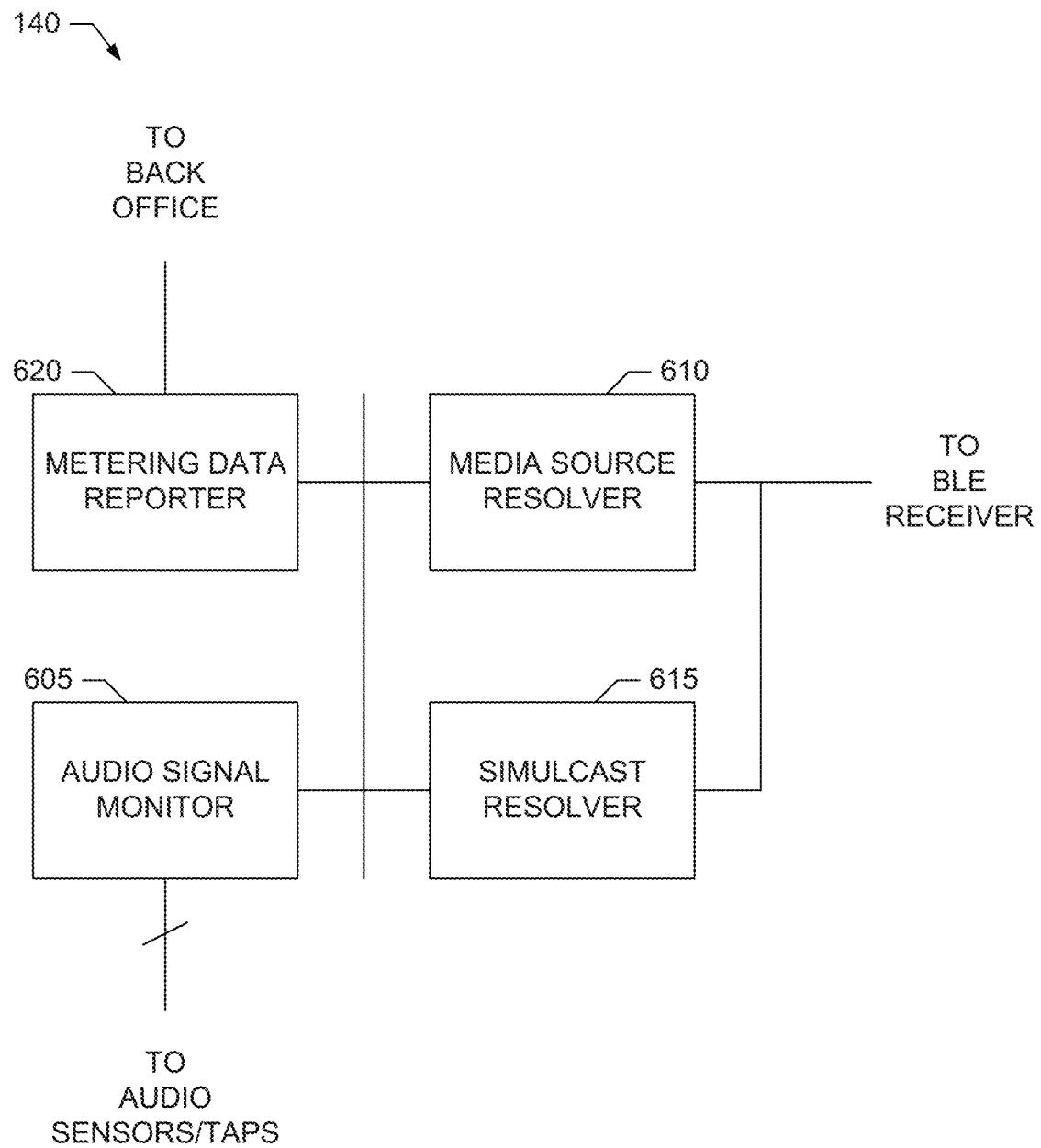
FIG. 6 is a block diagram of an example implementation of the meter included in the example media monitoring systems of FIGS. 1-3

A block diagram of an example implementation of the meter 140 included in the example media monitoring systems 100, 200, 300 of FIGS. 1-3 is illustrated in FIG. 6. The example meter 140 of FIG. 6 includes an example audio signal monitor 605 to receive and process, as described above and in further detail below, the audio signals obtained by the example microphone 125 and the example audio taps 130 and 135 to determine media source ambiguity conditions, media monitoring data (e.g., based on watermarks, signatures, etc.), etc. The example meter 140 of FIG. 6 also includes an example media source resolver 610 to process remote control motion hint data received by the example BLE receiver 165 from one or more of the example accelerometer tags 160, 170, 175 to resolve, as described above and in further detail below, media source detection ambiguities identified by the audio signal monitor 605. The example meter 140 of FIG. 6 also includes an example simulcast resolver 615 to process the remote control motion hint data received by the example BLE receiver 165 from one or more of the example accelerometer tags 160, 170, 175 to resolve, as described above and in further detail below, simulcast crediting ambiguities identified by the audio signal monitor 605. The example meter 140 of FIG. 6 further includes an example metering data reporter 620 to report metering data including the media identification data determined by the audio signal monitor 605 and the media source identification data determined by the example media source resolver 610 and/or the example simulcast resolver 615 to the back office 180. Example programs that may be executed to implement the example meter 140 of FIG. 6 are illustrated in FIGS. 7-8, which are described in further detail below.

While example manners of implementing example media monitoring systems 100, 200, and/or 300 in accordance with the teachings of this disclosure are illustrated in FIGS. 1-6, one or more of the elements, processes and/or devices illustrated in FIGS. 1-6 may be combined, divided, rearranged, omitted, eliminated and/or implemented in any other way. Further, the example meter 140, the example BLE receiver 165, the example BLE accelerometer tags 160, 170 and/or 175, the example back office 180, the example audio signal monitor 605, the example media source resolver 610, the example simulcast resolver 615, the example metering data reporter 620 and/or, more generally, the example media monitoring systems 100, 200 and/or 300 of FIGS. 1-6 may be implemented by hardware, software, firmware and/or any combination of hardware, software and/or firmware. Thus, for example, any of the example meter 140, the example BLE receiver 165, the example BLE accelerometer tags 160, 170 and/or 175, the example back office 180, the example audio signal monitor 605, the example media source resolver 610, the example simulcast resolver 615, the example metering data reporter 620 and/or, more generally, the example media monitoring systems 100, 200 and/or 300 of FIGS. 1-6 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example meter 140, the example BLE receiver 165, the example BLE accelerometer tags 160, 170 and/or 175, the example back office 180, the example audio signal monitor 605, the example media source resolver 610, the example simulcast resolver 615, the example metering data reporter 620 and/or, more generally, the example media monitoring systems 100, 200 and/or 300 of FIGS. 1-6 is/are hereby expressly defined to include a non-transitory computer readable storage device or storage disk such as a memory, a digital versatile disk (DVD), a compact disk (CD), a Blu-ray disk, etc. including the software and/or firmware. Further still, the example media monitoring systems 100, 200 and/or 300 of FIGS. 1-6 may include one or more elements, processes and/or devices in addition to, or instead of, those illustrated in FIGS. 1-3, and/or may include more than one of any or all of the illustrated elements, processes and devices.

Figure 7:
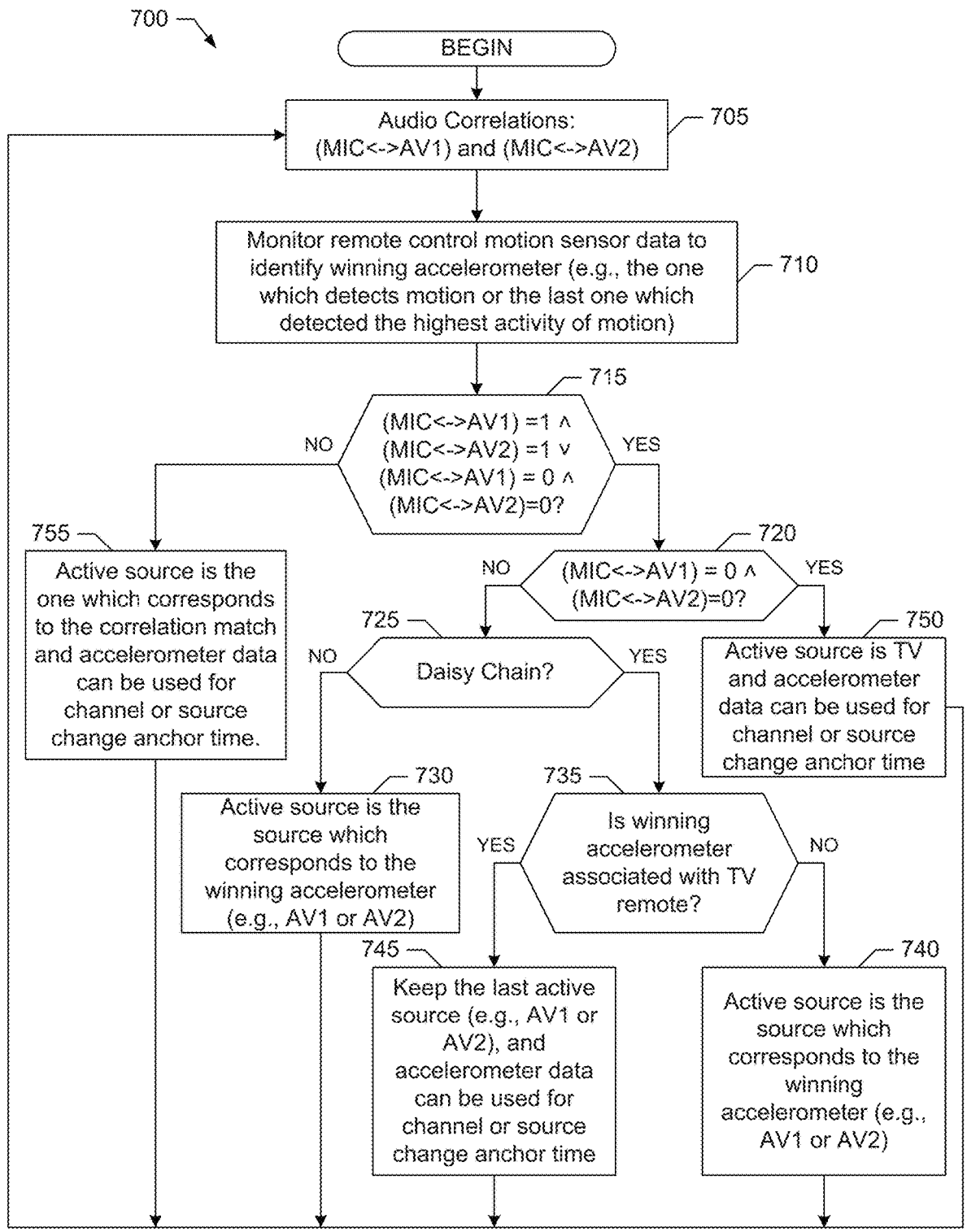
FIG. 7 is a flowchart representative of example machine readable instructions that may be executed by the example meter of FIGS. 1-3 and/or 6 to resolve media source detection ambiguities using motion sensor data in the example media monitoring systems of FIGS. 1-3.
Figure 8:
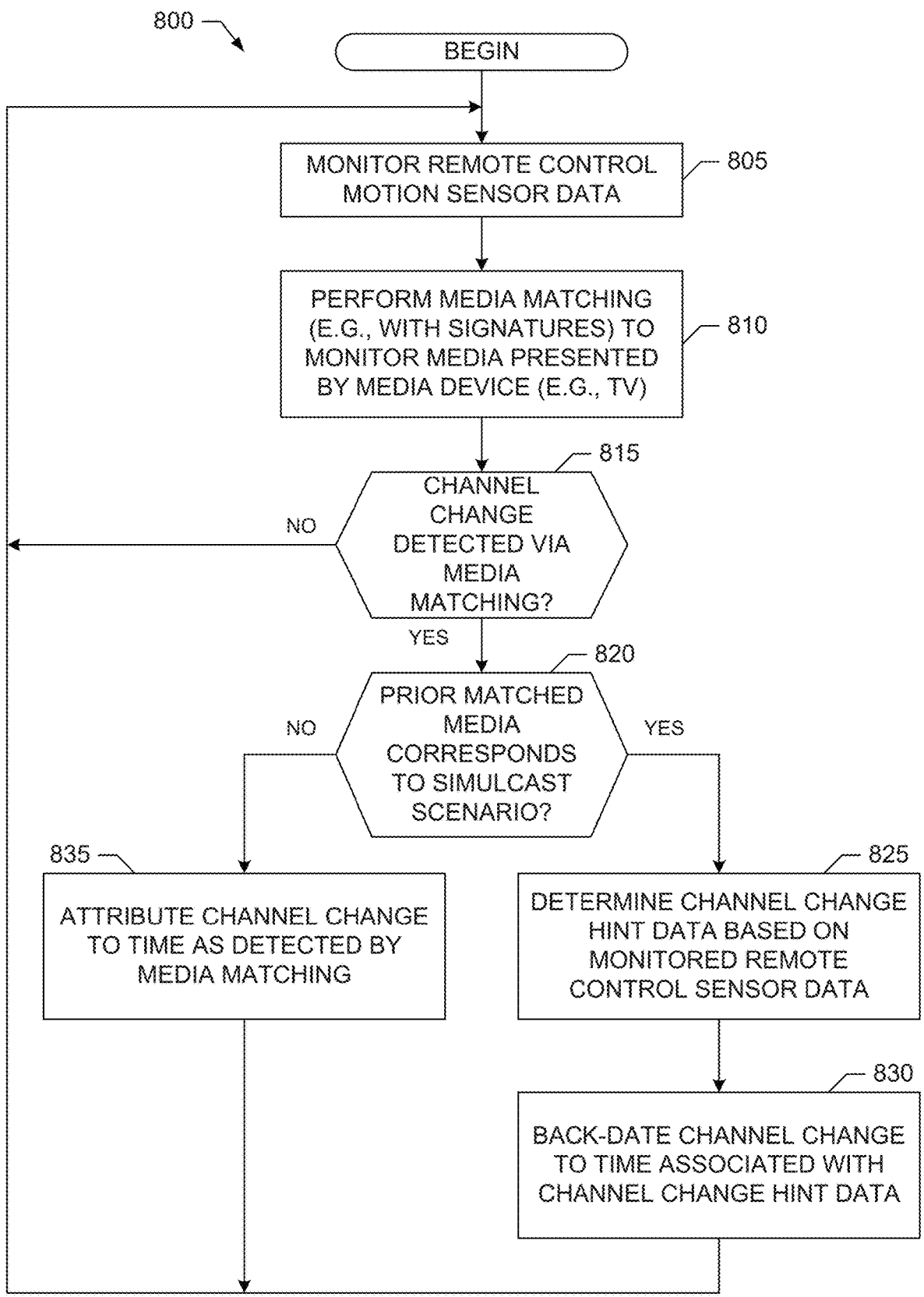
FIG. 8 is a flowchart representative of example machine readable instructions that may be executed by the example meter of FIGS. 1-3 and/or 6 to resolve simulcast detection ambiguities using motion sensor data in the example media monitoring systems of FIGS. 1-3.

Flowcharts representative of example machine readable instructions for implementing the example meter 140 and/or, more generally, the example media monitoring systems 100, 200 and/or 300 of FIGS. 1-6 are shown in FIGS. 7-8. In these examples, the machine readable instructions comprise one or more programs for execution by a processor, such as the processor 912 shown in the example processor platform 900 discussed below in connection with FIG. 9. The one or more programs, or portion(s) thereof, may be embodied in software stored on a non-transitory computer readable storage medium such as a CD-ROM, a floppy disk, a hard drive, a digital versatile disk (DVD), a Blu-Ray Disk™, or a memory associated with the processor 912, but the entire program or programs and/or parts thereof could alternatively be executed by a device other than the processor 912 and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 7-8, many other methods of implementing the example meter 140 and/or, more generally, the example media monitoring systems 100, 200 and/or 300 of FIGS. 1-6 may alternatively be used. For example, with reference to the flowcharts illustrated in FIGS. 7-8, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 7-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended. Also, as used herein, the terms "computer readable" and "machine readable" are considered equivalent unless indicated otherwise.

An example program 700 that may be executed in the example meter 140 of the example media monitoring systems 100, 200 and/or 300 of FIGS. 1-6 to leverage remote control motion hint data to resolve media source detection ambiguities is illustrated FIG. 7. In the illustrated example of FIG. 7, a positive audio correlation match between the audio signal captured on the microphone 125 (MIC), which corresponds to the output of the media output device 105 (e.g., TV), and the audio signal sensed by one of the audio taps 130 and 135 (e.g., Tap 1 and Tap 2), which correspond to the respective media sources 115 and 120 (e.g., AV1 or AV2) is represented by the value 1, whereas the value 0 represents no correlation match. Thus, in the example of FIG. 7, the notation (MIC<->AV1)=1 corresponds to the scenario in which the sensed audio from the microphone 125 (MIC) and the sensed audio from the tap 130 corresponding to the media source 115 (AV1) have a correlation match, and the notation (MIC<->AV1)=0 corresponds to the scenario in which the sensed audio from the microphone 125 (MIC) and the sensed audio from the tap 130 corresponding to the media source 115 (AB1) do not have a correlation match. Likewise, in the example of FIG. 7, the notation (MIC<->AV2)=1 corresponds to the scenario in which the sensed audio from the microphone 125 (MIC) and the sensed audio from the tap 135 corresponding to the media source 120 (AV2) have a correlation match, and the notation (MIC<->AV2)=0 corresponds to the scenario in which the sensed audio from the microphone 125 (MIC) and the sensed audio from the tap 135 corresponding to the media source 120 (AV2) do not have a correlation match. Also, in the example of FIG. 7, the symbol "A" represents the logical AND operation, and the symbol "V" represents the logical OR operation.

As illustrated in FIG. 7, the example program 700 begins with the audio signal monitor 605 of the meter 140 comparing the sensed audio from the microphone 125 (MIC) with the sensed audio from the audio taps 130 and 135 (e.g., Tap 1 and Tap 2), which correspond to the respective media sources 115 and 120 (e.g., AV1 or AV2). (Block 705). The example media source resolver 610 of the meter 140 also monitors the remote control motion data reported by one or more of the BLE accelerometer tags 160, 170, 175 affixed to the respective remote control devices 145, 150, 155 to identify a winning accelerometer, which may correspond to the accelerometer and, thus, remote control device most recently used (e.g., most recently exhibiting motion), the accelerometer associated with a particular type of motion (e.g., a channel change performed by the associated remote control device), etc. (See block 710). The example media source resolver 610 further employs such remote control motion hint data to resolve source detection ambiguities in response to detecting an ambiguity condition associated with media source detection.

For example, the media source resolver 610 employs remote control motion hint data to resolve source detection ambiguities when the audio signal monitor 605 of the meter 140 determines the sensed audio from the microphone 125 (MIC), which corresponds to the output of the media output device 105 (e.g., TV), matches sensed audio from multiple media sources 115 and 120 (e.g., AV1 and AV2), such as when (MIC<->AV1)=1^(MIC<->AV2)=1, which is a first example of an ambiguity condition associated with media source detection that can be identified by the audio signal monitor 605. (See Block 715). As shown in FIG. 7, when such a condition is satisfied, the example media source resolver 610 of the meter 140 uses motion detection hints, such as finding a winning accelerometer corresponding to the accelerometer reporting the last (e.g., most recent) motion data representative of a motion activity level, or in other words, an amount of movement satisfying a movement threshold and considering also any special movements detection (e.g., gestures, command inputs, etc.). For example, if (MIC<->AV1)=1^(MIC<->AV2)=1 (corresponding to "Yes" out of block 715 and "No" out of block 720), and the media sources 115 and 120 (e.g., AV1 and AV2) are not arranged in a daisy chain (e.g., as specified by configuration data provided to the program 700) (corresponding to "No" out of block 725), the example media source resolver 610 of the meter 140 detects the active media source to be the source associated with the remote control device coupled to the winning BLE accelerometer tag (e.g., the tag associated with the most recent motion, highest level of motion, most relevant motion, such as motion associated with input of a specific command, etc., as determined at block 710) (see block 730). However, if (MIC<->AV1)=1^(MIC<->AV2)=1 (corresponding to "Yes" out of block 715 and "No" out of block 720), and the media sources 115 and 120 (e.g., AV1 and AV2) are arranged in a daisy chain (e.g., as specified by configuration data provided to the program 600) corresponding to "Yes" out of block 725), the example media source resolver 610 of the meter 140 determines if the winning BLE accelerometer tag is associated with the remote control 160 of the media output device 105 (e.g., the TV remote control). (Block 735). If the winning BLE accelerometer tag is not associated with the TV remote control 160 (block 735), the winning BLE accelerometer tag is associated with one of the media source devices 115 or 120 (e.g., AV1 or AV2) and, thus, the example media source resolver 610 of the meter 140 detects the active media source to be the source associated with the winning BLE accelerometer tag. (Block 740). However, if the winning BLE accelerometer tag is associated with the remote control 160 of the media output device 105 (e.g., the TV remote control), the example media source resolver 610 of the meter 140 assumes the source is unchanged and, thus, credits the last active source (e.g., AV1 or AV2) as the currently active media source. (Block 745).

As illustrated in the example program 700 of FIG. 7, the example media source resolver 610 of the meter 140 also employs remote control motion hint data to resolve source detection ambiguities when the audio signal monitor 605 of the meter 140 determines the sensed audio from the microphone 125 (MIC), which corresponds to the output of the media output device 105 (e.g., TV), does not match sensed audio from any of the multiple media sources 115 and 120 (e.g., AV1 and AV2), such as when (MIC<->AV1)0^(MIC<->AV2)=0, which is a second example of an ambiguity condition associated with media source detection that can be identified by the audio signal monitor 605. (See Block 715). As shown in FIG. 7, when such a condition is satisfied (corresponding to "Yes" out of block 715 and "Yes" out of block 720), the example media source resolver 610 of the meter 140 detects the media output device 105 (e.g., TV) as the active media source. (Block 750).

As illustrated in the example of FIG. 7, the audio signal monitor 605 of the meter 140 may determine that no ambiguity condition associated with media source detection exists, such as when the sensed audio from the microphone 125 (MIC), which corresponds to the output of the media output device 105 (e.g., TV), matches sensed audio from just one of the multiple media sources 115 and 120 (e.g., AV1 and AV2), such as when (MIC<->AV1)1^(MIC<->AV2)=0, or (MIC<->AV1)0^(MIC<->AV2)=1. In such a case (corresponding to "No" out of block 715), the example media source resolver 610 of the meter 140 assumes the active media source is the source having the audio that matched the sensed audio from the microphone 125 (MIC). (Block 755).

As illustrated in the example of FIG. 7, the example media source resolver 610 of the meter 140 can also use the remote control motion hint data provided by the BLE accelerometers to identify anchor time corresponding to when a channel was changed, when a source was changed, when volume was changed, etc. (See blocks 745, 750 and 755).

The example program 700 can be executed on the meter 140 and/or at the back office 180 in the example media monitoring systems 100, 200 and/or 300 of FIGS. 1-6. In some examples in which the program 700 is executed primarily (or entirely) by the meter 140, the meter 140 uses the audio correlation result data (e.g., based on comparing audio samples, signatures, watermarks, etc. from the sensed audio from the media output device and the multiple media sources 115 and 120) and motion data from the BLE accelerometers 160, 170, 175 according to the example program 700 to identify the source (e.g., AV1, AV2 or TV) of the media presented by the media output device 105 (e.g., TV). In some examples in which at least relevant portions of the program 700 are executed by the back office 180, both audio correlation input data (e.g., corresponding to audio samples, signatures, watermarks, etc. obtained from the sensed audio from the media output device and the multiple media sources 115 and 120) as determined by the meter 140 and motion data from the BLE accelerometers 160, 170, 175 can be transferred to the back office 180 over the communication channel 185, such as the Internet, as shown in the examples of FIGS. 1-3. In some such examples, the back office 180 uses the audio correlation input data reported by the meter 140 and the motion data from the BLE accelerometers 160, 170, 175 according to the example program 700 to identify the source (e.g., AV1, AV2 or TV) of the media presented by the media output device 105 (e.g., TV). In some examples, the back office 180 also identifies the media being presented by the media output device (e.g., TV) using signatures and/or watermarks reported by the meter 140.

An example program 800 that may be executed in the example meter 140 of the example media monitoring systems 100, 200 and/or 300 of FIGS. 1-3 to leverage remote control motion hint data to resolve media source detection ambiguities is illustrated FIG. 8. As illustrated in the example program 800 of FIG. 8, the example simulcast resolver 615 of the meter 140 employs remote control motion hint data to resolve simulcast crediting ambiguities in response to the audio signal monitor 605 of the meter 140 detecting an ambiguity condition associated with simulcast broadcasting. For example, the example program 800 begins with the example simulcast resolver 615 of the meter 140 monitoring the remote control motion data reported by one or more of the BLE accelerometer tags 160, 170, 175 affixed to the respective remote control devices 145, 150, 155. (Block 805). The audio signal monitor 605 of the meter 140 also processes the audio signal captured on the microphone 125 (MIC), which corresponds to the output of the media output device 105 (e.g., TV), to perform media matching/identification (e.g., using watermarks, signatures, etc.). (Block 810). The simulcast resolver 615 then employs, as needed, remote control motion hint data to resolve simulcast crediting ambiguities when the audio signal monitor 605 of the meter 140 detects a channel change from prior matched media to new matched media (e.g., the audio signal monitor 605 detects the media output by the media output device 105 has changed).

For example, if a channel change is detected by the audio signal monitor 605 (e.g., based on identifying a media changes using watermarks, signatures, etc.) (block 815), the audio signal monitor 605 determines whether the prior matched media corresponds to a simulcast ambiguity condition (block 820). For example, the audio signal monitor 605 may determine the prior matched media corresponds to a simulcast ambiguity condition if the back office 180 of the media monitoring system 100, 200, 300 has reference media data (e.g., signatures watermarks, etc.) for at least two different broadcast sources that match the media (e.g., audio) sensed from the output of the media output device 105 during that same broadcast time. As shown in the example of FIG. 8, if the audio signal monitor 605 of the meter 140 determines the prior matched media corresponds to a simulcast ambiguity condition (block 820), the simulcast resolver 615 of the meter 140 processes motion data reported from the accelerometer tag 160 affixed to the remote control device 145 associated with the media output device 105 to determine channel change hint data (block 825). The simulcast resolver 615 of the meter 140 then uses this channel change hint data to adjust (e.g., back-date) the time associated with the channel change from the prior matched media to new matched media as detected by the audio signal monitor 605. (Block 830). However, if the audio signal monitor 605 of the meter 140 determines the prior matched media does not correspond to a simulcast ambiguity condition (block 820), simulcast resolver 615 of the meter 140 does not perform any adjusting (e.g., back-dating) of the time associated with the channel change (block 835).

The example program 800 can be executed on the meter 140 and/or at the back office 180 in the example media monitoring systems 100, 200, 300 of FIGS. 1-3. In some examples in which the program 800 is executed by the back office 180, both audio monitoring data determined by the meter 140 and motion data from the BLE accelerometers 160, 170, 175 can be transferred from the meter 140 to the back office 180 over the communication channel 185, such as the Internet, as shown in FIGS. 1-3. In some such examples, the back office 180 uses the audio monitoring data from the meter 140 and the motion data from the BLE accelerometers 160, 170, 175 to perform audio matching and resolve simulcast ambiguities according to the example program 800.

Figure 9:
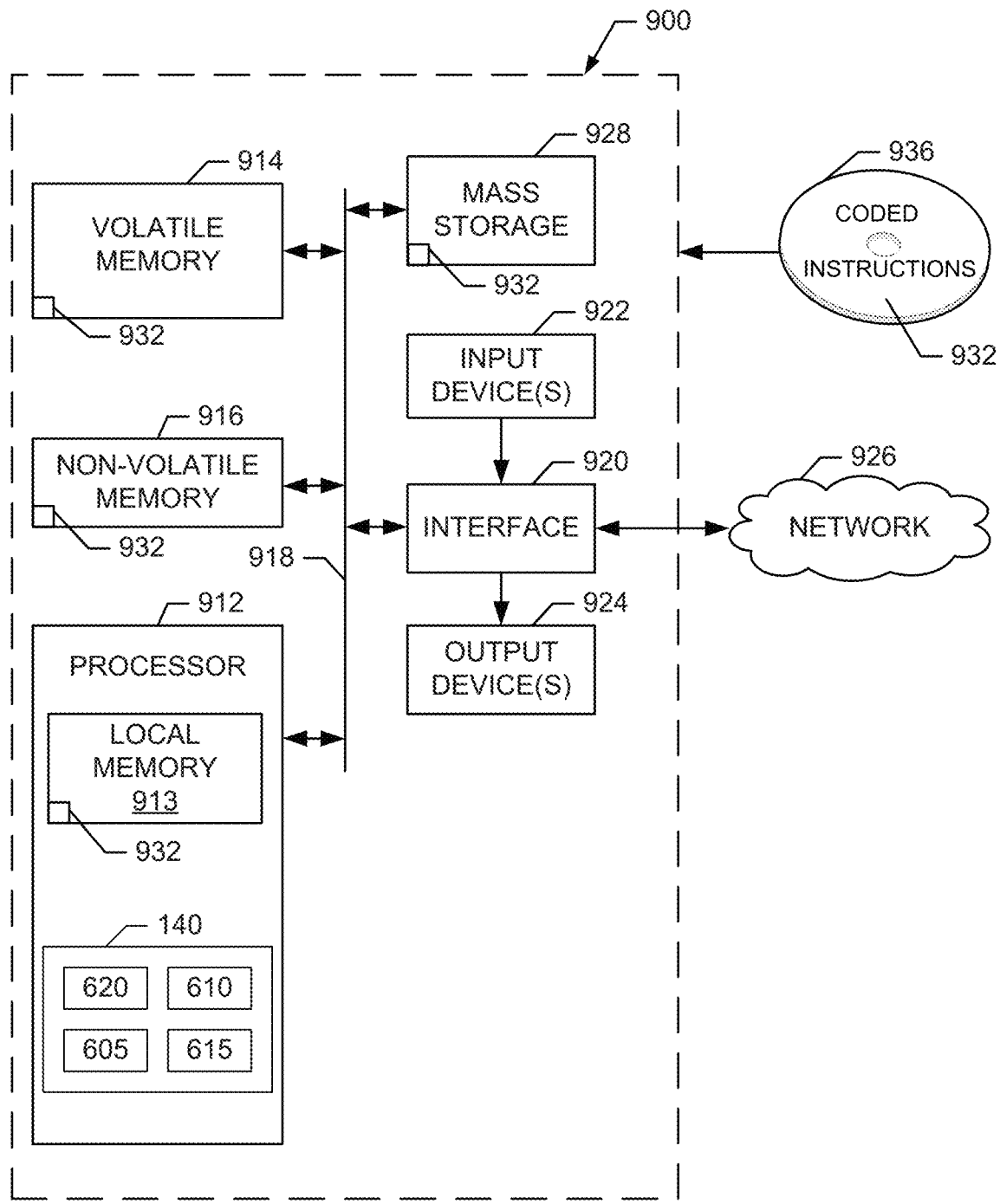
FIG. 9 is a block diagram of an example processor platform structured to execute the example machine readable instructions of FIGS. 7 and/or 8 to implement the example meter of the example media monitoring systems of FIGS. 1-3.

FIG. 9 is a block diagram of an example processor platform 900 structured to execute the instructions of FIGS. 7-8 to implement the example meter 140 and/or, more generally, the example media monitoring systems 100, 200, 300 of FIGS. 1-3. In some examples, the processor platform 900 can be used to implement the functionality (e.g., corresponding to blocks 605, 610 and/or 615 above) of the meter 140 that is directed to resolving media source detection and simulcast monitoring ambiguities in the back office 180. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box a digital camera, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware processor 912 may be a semiconductor based (e.g., silicon based) device. In this example, the processor 912 implements the example audio signal monitor 605, the example media source resolver 610, the example simulcast resolver 615 and/or the example metering data reporter 620 of the example meter 140 included in the example media monitoring systems 100, 200, 300 of FIGS. 1-3.

The processor 912 of the illustrated example includes a local memory 913 (e.g., a cache). The processor 912 of the illustrated example is in communication with a main memory including a volatile memory 914 and a non-volatile memory 916 via a link 918. The link 918 may be implemented by a bus, one or more point-to-point connections, etc., or a combination thereof. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 900, can allow the user to control the computer system and provide data to the computer using physical gestures, such as, but not limited to, hand or body movements, facial expressions, and face recognition.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID (redundant array of independent disks) systems, and digital versatile disk (DVD) drives.

Coded instructions 932 corresponding to the instructions of FIGS. 6-7 may be stored in the mass storage device 928, in the volatile memory 914, in the non-volatile memory 916, in the local memory 913 and/or on a removable tangible computer readable storage medium, such as a CD or DVD 936.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A metering apparatus to resolve media source detection ambiguities, the apparatus comprising:
at least one memory;
computer readable instructions; and
at least one processor to execute the instructions to:
   determine that an output media signal from a monitored media device corresponds to at least (i) a first media signal from a first source device in communication with the monitored media device, and (ii) a second media signal from a second source device in communication with the monitored media device;
   determine, based on configuration data, the first source device and the second source device are arranged in a daisy chain configuration;
   access motion data reported by one or more of a first accelerometer associated with a first remote control device, a second accelerometer associated with a second remote control device, and a third accelerometer associated with a third remote control device, the first remote control device associated with the first source device, the second remote control device associated with the second source device, and the third remote control device associated with the monitored media device; and identify, based on the motion data, a source of the output media signal from the monitored media device.

2. The apparatus of claim 1, wherein the at least one processor is to:

analyze the motion data to determine which one of the first accelerometer, the second accelerometer or the third accelerometer is associated with a most recent detection of movement that satisfied a movement threshold; and identify the source of the output media signal from the monitored media device based on whether the third accelerometer is associated with the most recent detection of movement that satisfied a movement threshold.

3. The apparatus of claim 2, wherein when the third accelerometer is not associated with the most recent detection of movement that satisfied a movement threshold, the at least one processor is to:

identify the source of the output media signal from the monitored media device to be the first source device when the first accelerometer is associated with the most recent detection of movement that satisfied a movement threshold; and identify the source of the output media signal from the monitored media device to be the second source device when the second accelerometer is associated with the most recent detection of movement that satisfied a movement threshold.

4. The apparatus of claim 2, wherein when the third accelerometer is associated with the most recent detection of movement that satisfied a movement threshold, the at least one processor is to identify the source of the output media signal from the monitored media device to be unchanged.

5. The apparatus of claim 4, wherein the at least one processor is to:

analyze the motion data to determine a first time associated with the most recent detection of movement that satisfied a movement threshold; and when the third accelerometer is associated with the most recent detection of movement that satisfied a movement threshold, associate the first time with an event.

6. The apparatus of claim 5, wherein the event corresponds to at least one of a channel change or a volume change.

7. The apparatus of claim 1, wherein the at least one processor is to:

compare a first correlation of the output media signal from the monitored media device with the first media signal from the first source device to a threshold to determine whether the output media signal from the monitored media device corresponds to the first media signal from the first source device; and compare a second correlation of the output media signal from the monitored media device with the second media signal from the second source device to the threshold to determine whether the output media signal from the monitored media device corresponds to the second media signal from the second source device.

8. At least one non-transitory computer readable medium comprising computer readable instructions that, when executed, cause at least one processor to at least:

determine that an output media signal from a monitored media device corresponds to at least (i) a first media signal from a first source device in communication with the monitored media device, and (ii) a second media signal from a second source device in communication with the monitored media device;

determine, based on configuration data, the first source device and the second source device are arranged in a daisy chain configuration;

access motion data reported by one or more of a first accelerometer associated with a first remote control device, a second accelerometer associated with a second remote control device, and a third accelerometer associated with a third remote control device, the first remote control device associated with the first source device, the second remote control device associated with the second source device, and the third remote control device associated with the monitored media device; and identify, based on the motion data, a source of the output media signal from the monitored media device.

9. The at least one non-transitory computer readable medium of claim 8, wherein the instructions cause the at least one processor to:

analyze the motion data to determine which one of the first accelerometer, the second accelerometer or the third accelerometer is associated with a most recent detection of movement that satisfied a movement threshold; and identify the source of the output media signal from the monitored media device based on whether the third accelerometer is associated with the most recent detection of movement that satisfied a movement threshold.

10. The at least one non-transitory computer readable medium of claim 9, wherein the instructions cause the at least one processor is to, when the third accelerometer is not associated with the most recent detection of movement that satisfied a movement threshold:

identify the source of the output media signal from the monitored media device to be the first source device when the first accelerometer is associated with the most recent detection of movement that satisfied a movement threshold; and identify the source of the output media signal from the monitored media device to be the second source device when the second accelerometer is associated with the most recent detection of movement that satisfied a movement threshold.

11. The at least one non-transitory computer readable medium of claim 10, wherein the instructions cause the at least one processor is to identify the source of the output media signal from the monitored media device to be unchanged when the third accelerometer is associated with the most recent detection of movement that satisfied a movement threshold.

12. The at least one non-transitory computer readable medium of claim 11, wherein the instructions cause the at least one processor to:

analyze the motion data to determine a first time associated with the most recent detection of movement that satisfied a movement threshold; and when the third accelerometer is associated with the most recent detection of movement that satisfied a movement threshold, associate the first time with an event.

13. The at least one non-transitory computer readable medium of claim 12, wherein the event corresponds to at least one of a channel change or a volume change.

14. The at least one non-transitory computer readable medium of claim 8, wherein the instructions cause the at least one processor to:
- compare a first correlation of the output media signal from the monitored media device with the first media signal from the first source device to a threshold to determine whether the output media signal from the monitored media device corresponds to the first media signal from the first source device; and
- compare a second correlation of the output media signal from the monitored media device with the second media signal from the second source device to the threshold to determine whether the output media signal from the monitored media device corresponds to the second media signal from the second source device.

15. A method to resolve media source detection ambiguities, the method comprising:
- determining that an output media signal from a monitored media device corresponds to at least (i) a first media signal from a first source device in communication with the monitored media device, and (ii) a second media signal from a second source device in communication with the monitored media device;
- determining, based on configuration data, the first source device and the second source device are arranged in a daisy chain configuration;
- accessing, by executing an instructions with at least one processor, motion data reported by one or more of a first accelerometer associated with a first remote control device, a second accelerometer associated with a second remote control device, and a third accelerometer associated with a third remote control device, the first remote control device associated with the first source device, the second remote control device associated with the second source device, and the third remote control device associated with the monitored media device; and
- identifying, by executing an instructions with the at least one processor, and based on the motion data, a source of the output media signal from the monitored media device.

16. The method of claim 15, further including analyzing the motion data to determine which one of the first accelerometer, the second accelerometer or the third accelerometer is associated with a most recent detection of movement that satisfied a movement threshold, wherein the identifying of the source of the output media signal from the monitored media device is based on whether the third accelerometer is associated with the most recent detection of movement that satisfied a movement threshold.

17. The method of claim 16, wherein when the third accelerometer is not associated with the most recent detection of movement that satisfied a movement threshold, the identifying of the source of the output media signal includes:
- identifying the source of the output media signal from the monitored media device to be the first source device when the first accelerometer is associated with the most recent detection of movement that satisfied a movement threshold; and
- identifying the source of the output media signal from the monitored media device to be the second source device when the second accelerometer is associated with the most recent detection of movement that satisfied a movement threshold.

18. The method of claim 16, wherein when the third accelerometer is associated with the most recent detection of movement that satisfied a movement threshold, the identifying of the source of the output media signal includes identifying the source of the output media signal from the monitored media device to be unchanged.

19. The method of claim 18, wherein the analyzing of the motion data includes analyzing the motion data to determine a first time associated with the most recent detection of movement that satisfied a movement threshold, and further including associating the first time with an event when the third accelerometer is associated with the most recent detection of movement that satisfied a movement threshold.

20. The method of claim 19, wherein the event corresponds to at least one of a channel change or a volume change.

\* \* \* \* \*